D. A. JAMES AND R. RAINES.
AUTOMATIC FEED ELECTRIC SOLDERING IRON.
APPLICATION FILED APR. 4, 1919.
1,316,617.
Patented Sept. 23, 1919.
2 SHEETS—SHEET 1.
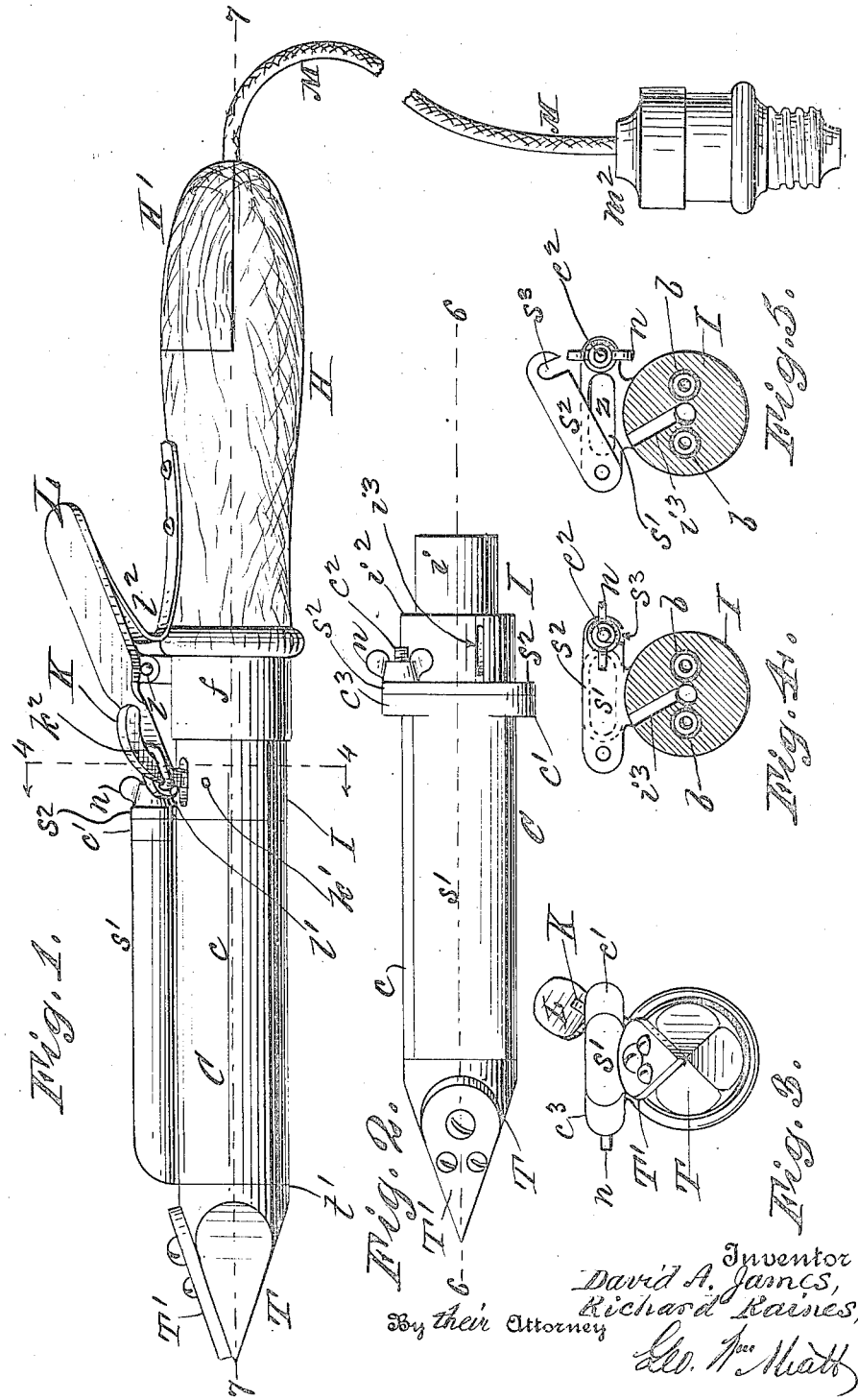

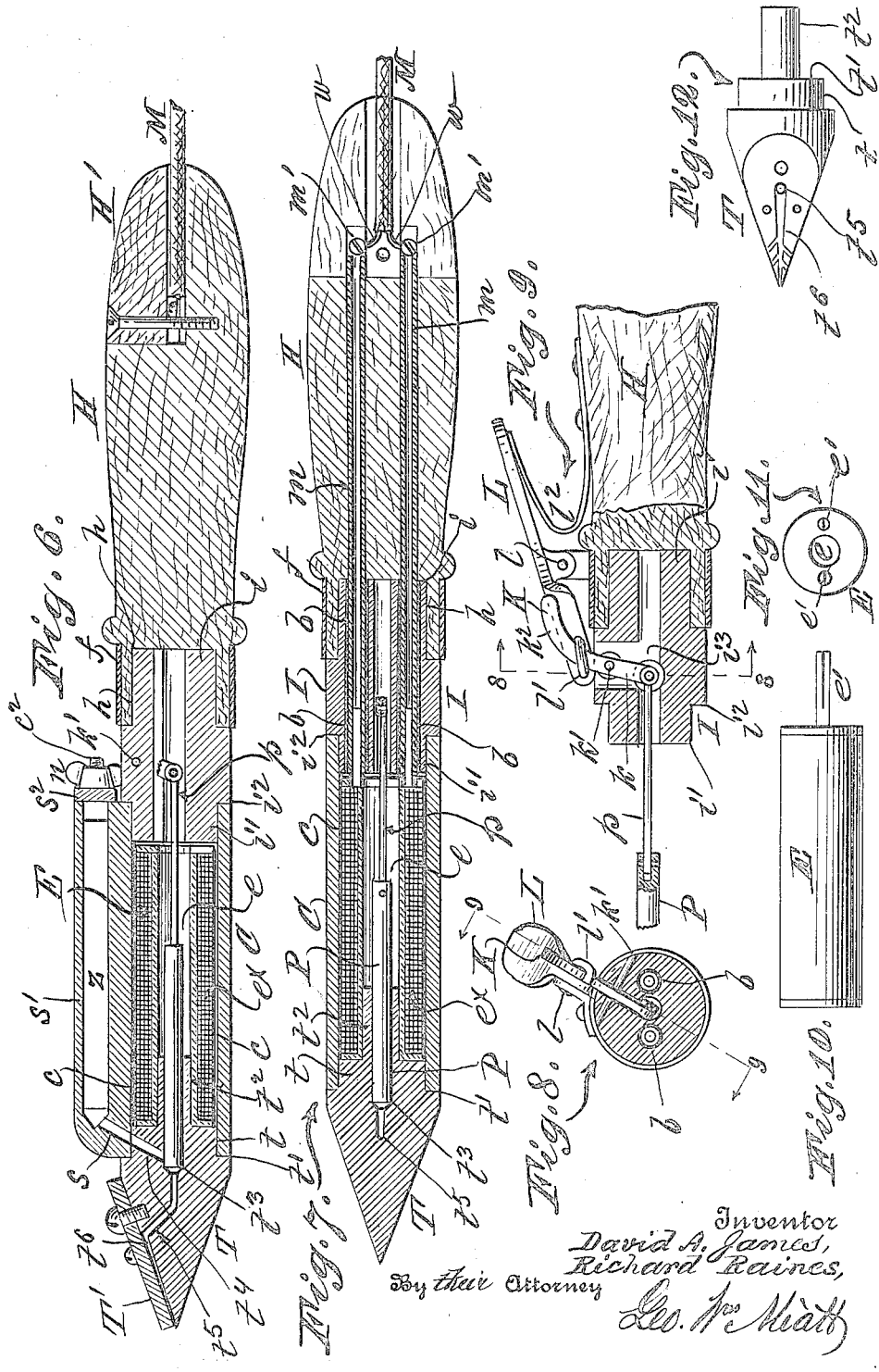

UNITED STATES PATENT OFFICE.

DAVID A. JAMES, OF NEW YORK, AND RICHARD RAINES, OF EAST WILLIAMS BRIDGE, NEW YORK.

AUTOMATIC-FEED ELECTRIC SOLDERING-IRON.

1,316,617.      Specification of Letters Patent.      Patented Sept. 23, 1919.

Application filed April 4, 1919. Serial No. 287,536.

*To all whom it may concern:*

Be it known that we, DAVID A. JAMES, a citizen of the United States, and a resident of the borough of Bronx, county of Bronx, city and State of New York, and RICHARD RAINES, a citizen of the United States, and a resident of East Williams Bridge, county of Bronx, and State of New York, have invented certain new and useful Improvements in Automatic-Feed Electric Soldering-Irons, of which the following is a specification.

Our improvements relate to electrically heated soldering irons in which the solder is reduced from solid to fluid form and fed to the tip as required for immediate application:—our main object being the production of a simple but effective implement of this character in which the feed of solder to the tip is rendered positive; in which the flow of solder can be effectually controlled and regulated to meet the varying requirements of use; in which the electrical connections are simple but convenient; in which ample provision is made for the expeditious replacement of the electric heating element when necessary, etc., all as hereinafter fully set forth,—our invention consisting in the specific construction and arrangement of parts described and claimed.

In the accompanying drawings,

Figure 1, is what may be designated as a side elevation of our improved soldering implement;

Fig. 2, a partial top view, or an elevation taken at right angles to Fig. 1;

Fig. 3, is an elevation of the tip end of the implement;

Fig. 4, is a section taken upon plane of line 4—4, Fig. 1;

Fig. 5, is a like view with the closure of the solder compartment partly raised;

Fig. 6, is a central longitudinal section taken upon plane of line 5—5, Fig. 2;

Fig. 7, is a central longitudinal section taken upon plane of line 7—7, Fig. 1;

Fig. 8, is a transverse section taken upon plane of line 8—8, Fig. 9;

Fig. 9, is a sectional detail taken on general plane of line 9—9, Fig. 8;

Fig. 10, is a side elevation of a replacement heating coil forming a component part of our soldering implement;

Fig. 11, is an elevation thereof; and

Fig. 12, is a view of the soldering tip without its cap plate.

H, represents a handle of wood or other nonconductive material, the inner end of which is formed with a mortise $h$, for the reception of the shank $i$, of the intermediate metallic coupling member I, upon the opposite extremity of which the metallic containing member C, is supported, said container member C, in turn supporting the soldering tip T,—these parts named being relatively secured together by any desired or well known mechanical expedients.

The container member C, is formed with a central cylindrical heater chamber $c$, into the ends of which fit respectively the shank $t$, of the soldering tip T, and the forward end $i'$, of the intermediate coupling member I, said forward end $i'$, of the coupling member I, being formed with a shoulder $i^2$, which abuts against the inner end of the container member C. In like manner the soldering tip T, is formed with an annular shoulder $t'$, which abuts against the outer end of the container member C, as shown more particularly in Figs. 6 and 7, of the drawings.

The shank $t$, of the soldering tip T, is also formed with a central tubular extension $t^2$, of an external diameter equal to the internal diameter of the hollow core $e$, of the electric heating element E, the forward portion of which fits over said central tubular extension $t^2$, of the shank of the soldering tip T, as shown in Figs. 6 and 7, so that said heating element E, is centralized and supported thereby within the chamber $c$.

The shank $t$, of the soldering tip T, and its extension $t^2$, are formed with an axial recess or bore $t^3$, for the accommodation of the forward end of a plunger P, the rear extremity of which is pivotally connected with a rod $p$, which in turn is pivotally connected to the inner end $k$, of a cam lever K, fulcrumed at $k'$, in a lateral recess $i^3$, in the intermediate coupling member I, as shown more particularly in Figs. 8 and 9. The pivotal connection at the opposite ends of the plunger rod $p$, are at right angles as related to each other, so that said rod is free to adapt itself to the movements of the cam lever K, and plunger P, without strain or binding of parts. In other words, the connecting rod $p$, practically performs the function of a universal joint in that its pivotal connections with the plunger P, and cam lever K, admit of free articulation laterally.

The length of the plunger P, is such that normally its forward end closes the port passage $t^4$, which connects the forward end of the axial bore $t^3$, with the duct $s$, (in the containing member C) which communicates with the solder chamber $s'$, as shown in Fig. 6,—said port passage $t^4$, and duct $s$, forming the means of communication between said solder chamber $s'$, and the forward end of said bore $t^3$, from the extremity of which a distributing duct $t^5$, extends through the soldering tip T, to one face thereof, said face being formed with bifurcated distributing grooves $t^6$ as shown in Fig. 12, and being preferably covered with a cap plate T', to control the flow of solder.

The forward end of the plunger P, thus normally performs the function of a valve to close the port passage $t^4$, but may also be used to forcibly eject the solder through the distributing duct $t^5$. Thus the plunger P, may be retracted to uncover the port passage $t^4$, by rocking the cam lever K, by means of the thumb lever L, which is pivotally supported on the handle H, at $l$, and formed with a loop $l'$, which embraces the upper curved portion of said cam lever K, as shown more particularly in Figs. 8 and 9, of the drawings. A spring $l^2$, interposed between the thumb lever L, and the handle H, as shown in Fig. 9, tends constantly to hold the forward end of said thumb lever L, against the intermediate coupling member I, with the loop $l'$, holding the cam lever K, with its inner short arm $k$, and the connection rod $p$, and plunger P, advanced to close the solder port $t^4$, as before stated. When however the rear arm of the thumb lever L, is depressed against the resistance of the spring $l^2$, the loop $l$, acting upon the curved upper arm $k^2$, of the cam lever K, rocks the latter sufficiently to retract the forward end of the plunger P, in whole or in part, away from the port passage $t^4$. As a result of the retraction of the plunger P, the solder flows into the forward end of the bore $t^3$, and through the discharge duct $t^5$, to the distributing grooves $t^6$. Obviously under these conditions if pressure is withdrawn from the thumb lever L, the spring $l^2$, will rock the levers L, K, back into the normal position described above, at the same time closing the port passage $t^4$, and ejecting the solder forcibly from the forward end of the bore $t^3$. Also, obviously, the flow of solder from the port passage $t^4$, may be controlled by manipulating the thumb lever according to requirements.

The solder chamber $s'$, into which the discharge duct $s$, opens, is formed in the container member C, preferably parallel to the cylindrical heating-chamber $c$, and adjacent thereto, so as to partake of the heat generated therein by the resistance coil E,—the container member becoming sufficiently hot not only to heat the soldering tip T, but also to melt the solder in the chamber $s'$. This solder chamber $s'$, is preferably of broad flat shape as shown in the accompanying drawings, particularly Fig. 5, to accommodate a flat bar $z$, of solder as indicated in said Fig. 5,—although this is not an essential feature, since our said solder chamber $s'$, adjacent to the heating chamber $c$, may be of any desired configuration in cross section without departing from the spirit and intent of our invention in this respect.

The rear end of the solder chamber $s'$, is closed by a door $s^2$, which is pivoted at one extremity to a lug $c'$, on the containing member C, adjacent to one side of the entrance to the solder chamber $s'$, and is formed with a concentric slot $s^3$, at its outer extremity to straddle a screw stud $c^2$, protuberant on another lug $c^3$, adjacent to the other side of the entrance to said soldering chamber $s'$,— a wing nut $n$, engaging with said screw stud $c^2$, and affording means whereby the door may be securely closed, or released for the insertion of fresh solder, as indicated in Fig. 5.

We use a heating element E, consisting essentially of a suitable resistance coil wound around a hollow central core $e$, adapted to fit upon the rear extension $t^2$, of the soldering tip T, as before stated. This heating element E, is cylindrical, and is provided at one extremity with electric terminals $e'$, $e'$, in the form of split pole studs, adapted to fit into the forward ends of metallic terminal tubes $m$, $m$, which extend through the intermediate coupling member I, and nonconducting handle H, as shown in Fig. 7,—the portions of the said metallic terminal tubes $m$, $m$, within the said intermediate coupling member I, being insulated therefrom by bushings $b$, $b$, of non-conducting material. The split poles $e'$, $e'$, effect positive electrical contacts with the terminal tubes $m$, $m$, and insure proper current transmission through the resistance coil $e^x$, which is indicated symbolically in Figs. 6 and 7, of the drawings by cross hatching.

The terminal tubes $m$, $m$, extend back to the rear of the handle H, where the latter is formed with a removable section H', to give access to the binding screws $m'$, $m'$, for securing the ends of the conducting wires $w$, $w$, which form part of the usual flexible cable M, the other extremity of which terminates in an electric plug $m^2$, for coupling up with an electric circuit in a manner well known in the art. $f$, is a metallic ferrule surrounding and reinforcing the sides of the socket $h$, in which the shank $i$, of the intermediate coupling member I, is embedded.

By this construction of heating element E, with protuberant pole studs $e'$, $e'$, and the provision of the tube terminals $m$, $m$, we are enabled to readily replace a heating element when desired for any reason, it being well known that the "life" of each such element is problematic and uncertain, so that a convenient replacement is a desideratum.

Other advantages we attain by our invention are the perfect control of the flow of solder by means of the thumb lever L, and connections, and the ability to eject the solder forcibly when desired by means of the plunger P. Furthermore our soldering implement is simple and substantial in construction and operation, and adapted for service under all the varying requirements of use.

The cap plate T', on the soldering tip T, is also of importance in controlling the flow of solder through the distributing channels $t^6$, and is, applicants believe, a new feature in soldering irons of this character.

What we claim as our invention and desire to secure by Letters Patent is:

1. In an electric soldering implement of the character designated, a soldering tip formed with an axial bore and solder conduits, a hollow core electric element, a plunger positioned in said bore and core, a solder chamber, ducts connecting same with said bore in the soldering tip, and means for reciprocating said plunger, consisting of a cam lever, a universally articulated rod connecting said lever with said plunger, a thumb lever controlling said cam lever, and a spring controlling said thumb lever, for the purpose described.

2. In combination with an electric soldering implement of the character designated, formed with a handle and circuit terminal tubes extending to the rear of and terminating within said handle, bushings of nonconducting material insulating said terminal tubes from the metallic parts of said implement, and an electric heating element formed with pole studs adapted to fit into said terminal tubes whereby the heating element can be readily removed, for the purpose described.

3. In an electric soldering implement of the character designated, a handle, a soldering tip formed with an axial bore and solder conduits, a hollow core electric element, a plunger positioned in said bore and core and working in a recess in the tip, a solder chamber, ducts connecting same with said bore in the soldering tip, an intermediate coupling member, and means pivotally mounted within said intermediate coupling member for reciprocating said plunger consisting of a cam lever connected with said plunger, a thumb lever controlling said cam lever, and a spring controlling said thumb lever, for the purpose described.

4. In an electric soldering implement of the character designated, a soldering tip formed with an axial bore and solder conduits, and with distributing channels on one face of the tip, and a distributing cap plate fitting over said distributing channels, for the purpose described.

5. In an electric soldering implement, a soldering tip having a tubular extension, an electric heating element having a hollow core receiving said extensions, a chamber receiving said element, a handle, an intermediate coupling member, interengaging elements within the handle and heating element for removably retaining said parts in alinement, a plunger and movably mounted plunger connecting means mounted in said coupling member.

DAVID A. JAMES.
RICHARD RAINES.

Witnesses:
GEO. WM. MIATT,
DOROTHY MIATT.